United States Patent
Andersson

[15] 3,687,300
[45] Aug. 29, 1972

[54] LOAD HANDLING MECHANISM

[72] Inventor: Per Ulf Andersson, Bovallstrandsgatan 5E, Goteborg, Sweden

[22] Filed: Dec. 7, 1970

[21] Appl. No.: 95,558

[52] U.S. Cl. ........................214/1 Q, 214/130 C
[51] Int. Cl. ...................................B65g 7/00
[58] Field of Search........214/1 Q, 1 QA, 1 QF, 1 QG, 214/130 R, 130 A, 130 C

[56] References Cited

UNITED STATES PATENTS

| | | | |
|---|---|---|---|
| 3,239,944 | 3/1966 | Gebert | 214/1 Q X |
| 2,596,401 | 5/1952 | Hines | 214/1 QF |

FOREIGN PATENTS OR APPLICATIONS

| | | | |
|---|---|---|---|
| 148,895 | 2/1955 | Sweden | 214/1 Q |
| 864,780 | 4/1961 | Great Britain | 214/1 Q |

*Primary Examiner*—Gerald M. Forlenza
*Assistant Examiner*—Frank E. Werner
*Attorney*—Holman & Stern

[57] ABSTRACT

To turn large pieces of goods 90° a mechanism is provided, which includes a platform hingedly connected to a base structure in such a manner that the upper face of the platform will be flush with the level of a spot upon which large pieces of goods to be turned 90° are brought. This spot may be a weighing machine or a part of a conveyor. The platform is provided with a telescopic pillar mounted perpendicurlarly thereto, which at its end remote from the platform is provided with an arm extending over the platform. Power operated means are provided, to swing the platform 90° in relation to the base structure, and to adjust the length of the telescopic pillar, respectively, to make the arm thereof fore a piece of goods placed on abovementioned spot towards the platform, when the latter has been brought to vertical position. Thereupon the platform may be swung back to horizontal position, while the pillar and the arm maintain the piece of goods locked upon the platform.

6 Claims, 4 Drawing Figures

LOAD HANDLING MECHANISM

BACKGROUND OF THE INVENTION

The handling of many kinds of goods, for instance rolls of paper, requires that the piece of goods, i.e. the paper roll, must be turned 90° at least once. Rolls of paper leave a paper machine with its axis horizontal, and it is usually required that the rolls are transported and stored with their axes vertical. The transportation of the paper rolls from the machine to the store is usually done by special trucks provided with gripper means, which permit the lifting of the roll and a subsequent turning thereof. Such a truck is very expensive, and can be used for this specific purpose only. The gripper means of the truck will also easily damage the rolls, which is specially marked on such occasions when the original roll is first cut to slices and then wrapped in a sheet or cover to make up the unit to be handled, or when the roll consists of tissue or other soft paper.

SUMMARY OF THE INVENTION

According to the present invention a permanent turning mechanism, including a hinged platform having clamping means, is provided. In order to turn the piece of goods this is transported along a conveyer or by any other suitable means to the platform, which is swung to a vertical position in readiness to receive the piece of goods. The platform is provided with clamping means comprising a telescopic pillar having an arm at its free end. A load pallet is preferably placed adjacent to the platform, a piece of goods is moved along the same and the clamping means is brought into action, whereupon the platform is swung back to horizontal position, thereby turning the piece of goods 90°. The pallet now carrying the goods may then be removed by an ordinary fork lift truck.

BRIEF DESCRIPTION OF THE DRAWINGS

One embodiment of the invention adapted to handle rolls of paper of different diameter and length is shown on the accompanying drawings, on which

DESCRIPTION OF THE PREFERRED EMBODIMENT

Figure 1:
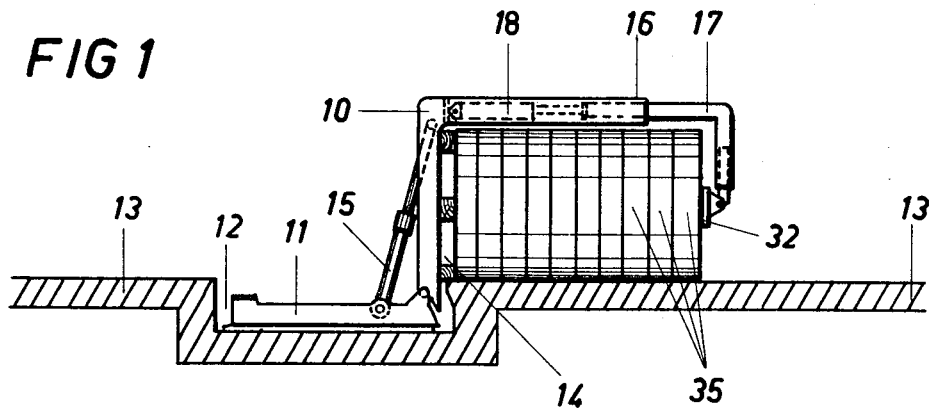
FIG. 1 is an elevation of the mechanism brought to a position in which it will clamp a roll of paper.

The mechanism comprises a platform 10 of generally quadrilateral form, which at one side is pivotally connected to a base structure 11. This structure is mounted sunk in a recess 12 in a building floor, 13 or the like, in such a manner that the upper face of the platform 10 will be flush with the level of the floor when the platform rests in a horizontal position. The floor includes a spot adjacent to the hinged side of the platform, upon which large pieces of goods 35 may be placed. In this case large rolls of paper are considered, and the spot may be a weighing machine located close by the paper machine or part of a conveyer along which the rolls are transported from the latter.

It is desired that the rolls be swung 90° and placed upon a load pallet 14.

A plurality of pressure fluid operated jacks 15 are fitted between the base structure 11 and the platform 10 and are provided with suitable operating means, not shown, whereby the platform may be swung 90° in relation to the base structure to bring it into a vertical position adjacent to the spot 13 of the floor. The platform is at the side thereof remote from the hinged side provided with a pillar composed of two parts 16 and 17, which are telescopically movable in relation to each other, by means of a pressure operated ram 18. The height of the pillar with respect to the platform may thus be adjusted to accomodate rolls of paper of different length.

The pillar is at its upper free end provided with an arm arranged perpendicularly to the pillar in such a manner that it will extend over the platform. This arm is composed of an inner part 19, which is integral with the upper part 17 of the pillar, and an outer part 20, which is telescopically movable in relation to the inner part 19 of the arm. Locking means, such as pegs 21 fitting into holes 22 of the respective parts, will lock the parts together to give the arm a suitable reach over the platform.

Figure 4:
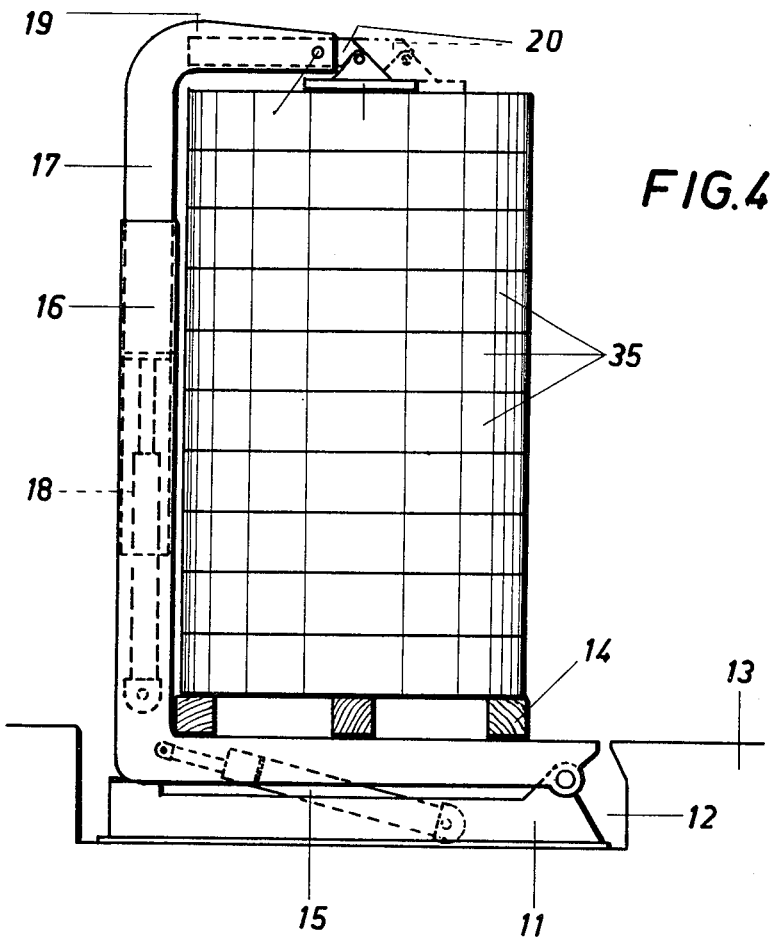
FIG. 4 shows the mechanism with the roll of paper swung back to vertical position.
Figure 2:
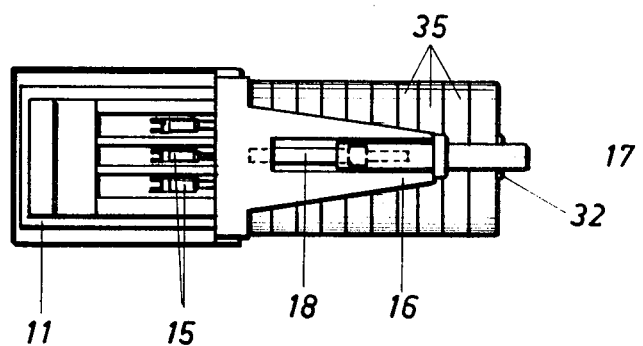
FIG. 2 shows the mechanism as seen from above, FIG. 3 on a larger scale shows a part of the pillar and the arm.

As is evident from FIG. 1 and FIG. 4 the arm may be extended to fit over the center of a roll irrespective of the diameter thereof. The outer arm part 20 is provided with a pressure plate 33 covered by a sheet of rubber 33a or similar high friction and/or deformable material to give it a good grip on the top of the roll.

When the platform has been swung to vertical position and the pallet fitted the roll of paper is brought to a the spot and the pillar the arm are made to clamp the roll as shown in FIG. 1. Thereby, the roll and the pallet are securely attached to the platform during the subsequent swiveling thereof to the horizontal position. When the clamping of the arm has been released, the pallet with the roll of paper may be removed by a fork lift truck or the like, and stored in the usual manner.

Figure 3:
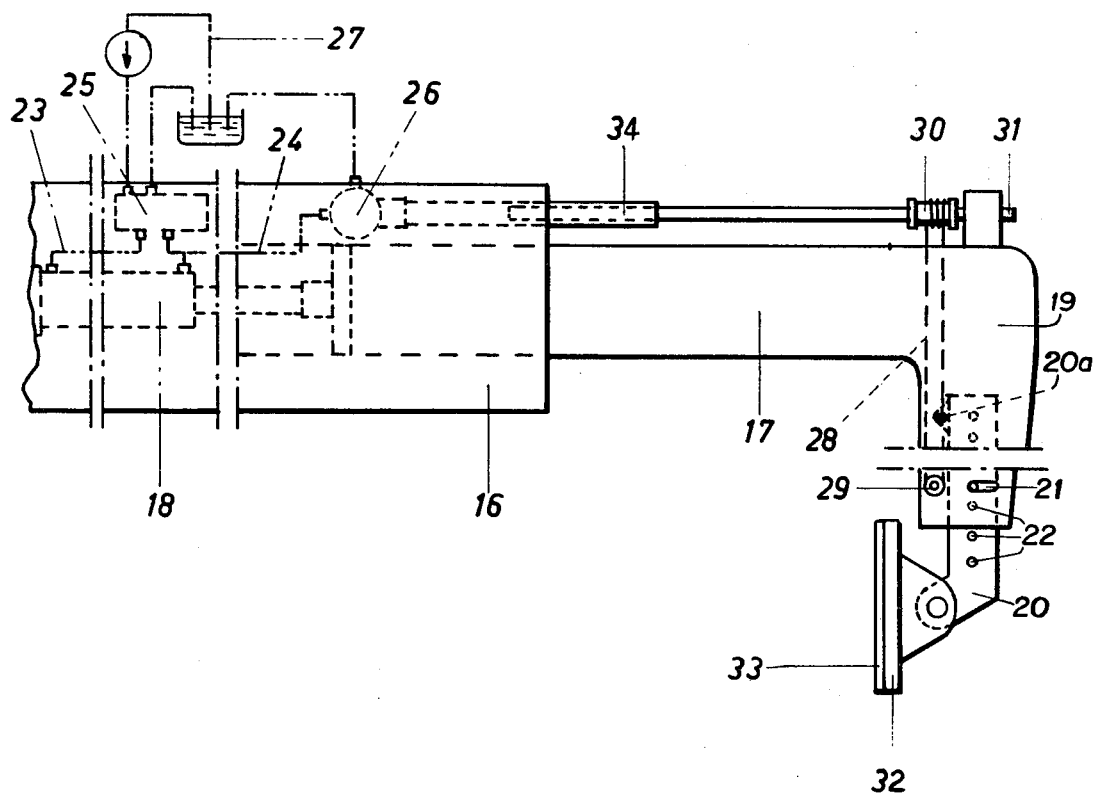

The fluid supplied circuit to the ram 18 is of conventional type, including pipes 23 and 24, respectively, connected to each end of the ram cylinder and governed by means of a valve 25, in such a manner that the pressure fluid from a source not shown on the drawing will be associated with one end of the cylinder, as desired, and simultaneously withdrawn from the other. In order to bring the mechanism to a clamping action pressure fluid will be supplied through pipe 24 to the right side of the cylinder 18, as shown in FIG. 3. A pressure relief valve 26 having a biasing member is connected to pipe 24, and pressure fluid bled off through valve 26 is conveyed back to the system by pipe 27. This is a safety valve of well known type. The pressure exerted on the pillar by the ram 18 will have to depend upon the length of the arm and on the moment of force to be applied to the roll of paper. To that end a wire 28 is attached to the outer arm part 20 and is led over a pulley 29 thereon to a further pulley 30 on a rod 31, which is fitted on the pillar, and then back to part 20. This endless wire will thus inpart a rotary movement to the rod 31, which depends on the position of part 20 in relation to part 19. Rod 31 is by means of a splined connection mounted in a sleeve 32, which is connected to the biasing member of the valve 26 in such a manner that the force of this biasing member will decrease as the distance of part 20 from the pillar increases. Valve 26 is designed in such a manner that the pressure in the supply circuit may be adjusted to maintain a minimum force required for clamping the material to be handled, which diminished the risk of damage.

The invention may also be used to handle bale goods, and the size of the pillar and the arm will of course have to be determined according to the size of the pieces of goods to be considered.

What I claim is:

1. A load handling mechanism for clamping large pieces of goods and turning them by 90°, comprising: a generally quadrilateral shaped platform disposed horizontally in flush with a floor level, the platform having hinge means on one side thereof to enable the platform to be turned about the hinged means into a substantially vertical position; a telescopic pillar secured perpendicularly to the platform at a side thereof remote from said one side having the hinge means; an arm and a clamping pressure plate attached thereto and extending substantially perpendicularly at a free end of said telescopic pillar in a manner as to extend over said platform, said arm including an adjustable mounting means therein so as to vary a distance of said clamping pressure plate from said pillar; a first power-operated means to rotate the platform about said hinge means by substantially 90° in relation to a base structure; and a second power-operated means to adjust the length of the telescopic pillar to make said clamping pressure plate secure goods placed between said platform and the clamping pressure plate.

2. The load handling mechanism according to claim 1 in which the arm consists of two telescopically extensible parts to make the clamping pressure plate reach varying distances over the platform.

3. The load handling mechanism according to claim 2 in which the first power operated means contains at least one pressure fluid jack connected to a fluid supply circuit including a pressure relief valve having an adjustable biasing member, the jack also comprising an actuating mechanism for automatically adjusting the biasing member in response to the extension of the arm.

4. The load handling mechanism according to claim 3, further including means for adjusting the pressure in the fluid supply circuit to maintain a minimum force required for clamping the material to be handled.

5. The load handling mechanism according to claim 1, having a resilient material covering a clamping side of said clamping pressure plate.

6. The load handling mechanism according to claim 1, in which said clamping pressure plate is provided with means by which it is swivel-mounted on an extension of said arm.

* * * * *